(12) United States Patent
Falk et al.

(10) Patent No.: US 11,797,771 B2
(45) Date of Patent: Oct. 24, 2023

(54) CLASSIFYING DEVICES FROM ENTITY NAMES BASED ON CONTEXTUAL INFORMATION

(71) Applicant: Honeywell International Inc., Charlotte, NC (US)

(72) Inventors: Bose Falk, Prague (CZ); Jiri Vass, Prague (CZ); Paul Kleinhans, Cuyahoga Falls, OH (US); Jakub Malanik, Prague (CZ); Cuong Huynh, Renton, WA (US); Patrick Brisbine, Mill Creek, WA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 155 days.

(21) Appl. No.: 17/190,334

(22) Filed: Mar. 2, 2021

(65) Prior Publication Data

US 2021/0256212 A1     Aug. 19, 2021

Related U.S. Application Data

(63) Continuation of application No. 16/206,629, filed on Nov. 30, 2018, now Pat. No. 10,936,818.

(51) Int. Cl.
*G06F 40/295*     (2020.01)
*F24F 11/30*     (2018.01)
*H04L 61/30*     (2022.01)

(52) U.S. Cl.
CPC ............ *G06F 40/295* (2020.01); *F24F 11/30* (2018.01)

(58) Field of Classification Search
CPC .... G06F 40/279; G06F 40/284; G06F 40/295; F24F 11/30; F24F 11/32; F24F 11/38; H04L 61/30; H04L 61/3015
USPC ........................... 704/1, 9, 10; 700/275, 276
See application file for complete search history.

(56) References Cited

U.S. PATENT DOCUMENTS

| | | | |
|---|---|---|---|
| 5,418,717 A | 5/1995 | Su et al. | |
| 6,278,987 B1 | 8/2001 | Reed et al. | |
| 8,402,032 B1 * | 3/2013 | Brunsman | G06F 40/295 707/711 |
| 8,533,203 B2 * | 9/2013 | Chaudhuri | G06F 40/247 707/728 |
| 9,170,574 B2 | 10/2015 | Fuller et al. | |
| 9,251,472 B1 * | 2/2016 | Linowes | F24F 11/49 |
| 9,488,969 B2 | 11/2016 | Brady et al. | |
| 9,514,411 B2 | 12/2016 | Chen et al. | |
| 9,665,079 B2 * | 5/2017 | Heine | G05B 15/02 |
| 9,879,873 B2 | 1/2018 | Malve et al. | |
| 10,372,567 B2 * | 8/2019 | Rensing | G06N 5/025 |
| 10,742,687 B2 * | 8/2020 | Pandian | H04L 61/5014 |
| 10,936,818 B2 * | 3/2021 | Falk | G06F 40/295 |
| 10,979,447 B2 * | 4/2021 | Pandian | H04L 63/1425 |
| 2003/0200198 A1 | 10/2003 | Chandrasekar et al. | |
| 2005/0084152 A1 | 4/2005 | Mcpeake et al. | |
| 2008/0091674 A1 | 4/2008 | Allen et al. | |

(Continued)

*Primary Examiner* — Martin Lerner
(74) *Attorney, Agent, or Firm* — Seager, Tufte & Wickhem, LLP

(57) ABSTRACT

A controller for classifying devices of a building management system (BMS). The controller may be configured to obtain an entity name for a device, extract a core name from the entity name, compare the core name to candidate core names, determine scores for each comparison, identify a highest score, identify a class of a candidate core name, and classify the device in the class.

17 Claims, 10 Drawing Sheets

(56) References Cited

U.S. PATENT DOCUMENTS

| | | |
|---|---|---|
| 2008/0319978 A1 | 12/2008 | Brun et al. |
| 2009/0063470 A1* | 3/2009 | Peled .................... G06F 40/295 |
| 2009/0300174 A1 | 12/2009 | Floris et al. |
| 2010/0076972 A1* | 3/2010 | Baron ................... G06F 40/295 |
| | | 707/736 |
| 2012/0072029 A1* | 3/2012 | Persaud ................... G06N 5/04 |
| | | 706/12 |
| 2013/0124964 A1* | 5/2013 | Viegas .................. G06F 40/295 |
| | | 715/230 |
| 2014/0032555 A1 | 1/2014 | Kiff et al. |
| 2014/0156263 A1 | 6/2014 | Patman Maguire |
| 2016/0062994 A1 | 3/2016 | Agarwal et al. |
| 2016/0321268 A1 | 11/2016 | Gillam et al. |
| 2017/0284691 A1 | 10/2017 | Sinha et al. |
| 2017/0364046 A1 | 12/2017 | Westrick, Jr. et al. |
| 2018/0292098 A1* | 10/2018 | Bandyopadhyay ...... F24F 11/58 |
| 2018/0375678 A1 | 12/2018 | Lapsley |
| 2019/0095644 A1* | 3/2019 | Park ...................... G06F 16/288 |
| 2019/0347358 A1 | 11/2019 | Mishra et al. |
| 2019/0390866 A1 | 12/2019 | Brisbine et al. |
| 2020/0225623 A1 | 7/2020 | Vass et al. |

\* cited by examiner

| Customer | site_entity_name | site_entity_name |
|---|---|---|
| customer 1 | Site1 | 'RTU 1 S.RGTREAR' |
| customer 1 | Site1 | 'RTU 2 S.RGTFRNT' |
| customer 1 | Site1 | 'RTU 3 S.LFTREAR' |
| customer 1 | Site1 | 'RTU 4 S.LFTFRNT' |
| customer 1 | Site1 | 'RTU 5 SALESCNTR' |
| customer 1 | Site1 | 'RTU 6 CASH/COUNT' |
| customer 1 | Site1 | 'RTU 7 RECEIVING' |
| customer 1 | Site1 | 'RTU 8 MGR/$/RRs' |
| customer 1 | Site1 | 'RTU 9 COPYCNTR' |
| customer 1 | Site2 | 'RTU 1 S.RGTREAR' |
| customer 1 | Site2 | 'RTU 2 S.RGTFRNT' |
| customer 1 | Site2 | 'RTU 3 S.LFTREAR' |
| customer 1 | Site2 | 'RTU 4 S.LFTFRNT' |
| customer 1 | Site2 | 'RTU 5 MGR/RR' |
| customer 1 | Site2 | 'RTU 6 CENTER' |
| customer 1 | Site2 | 'RTU 1 S.LFTCNTR' |
| customer 1 | Site2 | 'RTU 2 S.LFTREAR' |

FIG. 4B

| candidate_core_names |
|---|
| LeftRear |
| RightRear |
| Manager |
| MgrOffice |
| Storeroom |
| Receiving |

Table 700:

| Core Name | Bigram Set | Ratio Matches/Total Set Size | Preliminary Score | Classification Score |
|---|---|---|---|---|
| LftRear | "L,f","f,t","t,R","R,e","e,a","a,r" | 5/6 | 0.83333 | 1.5476 |
| LeftRear | "L,e","e,f","f,t","t,R","R,e","e,a","a,r" | 5/7 | 0.71428 | |

Table 702:

| Core Name | Bigram Set | Ratio Matches/Total Set Size | Preliminary Score | Classification Score |
|---|---|---|---|---|
| LftRear | "L,f","f,t","t,R","R,e","e,a","a,r" | 4/6 | 0.66666 | 1.16666 |
| RightRear | "R,i","i,g","g,h","h,t","t,R","R,e","e,a","a,r" | 4/8 | 0.5 | |

| Core Name | Entity Class | Classification Score |
|---|---|---|
| LeftRear | 1 | 1.5476 |
| RightRear | 1 | 1.16666 |
| Manager | 2 | 0.2 |
| MgrOffice | 2 | 0 |
| Storeroom | 3 | 0.5 |
| Receiving | 3 | 0.2 |

802

| Entity Class | Highest Score Within Class | Precision Score |
|---|---|---|
| 1 | 1.5476 | 3.33332 |
| 2 | 0.2 | |
| 3 | 0.5 | |

FIG. 4E

| Editor – EntityNameClassifier_wrapper.m | | | | Variables - struEntityClasses | |
|---|---|---|---|---|---|
| struEntityClasses × | | | | | |
| 10997x1 struct with 5 fields | | | | | |
| Fields | CUST_CD | site_entity_name | NTT_SK | entity_name | EntityClass |
| 1 | 'STP' | 'STP 1' | 113009 | 'RTU 1 S.RGTREAR' | 1 |
| 2 | 'STP' | 'STP 1' | 113015 | 'RTU 2 S.RGTFRNT' | 1 |
| 3 | 'STP' | 'STP 1' | 113018 | 'RTU 3 S.LFTREAR' | 1 |
| 4 | 'STP' | 'STP 1' | 113021 | 'RTU 4 S.LFTFRNT' | 1 |
| 5 | 'STP' | 'STP 1' | 113024 | 'RTU 5 SALESCNTR' | 1 |
| 6 | 'STP' | 'STP 1' | 113027 | 'RTU 6 CASH/COUNT' | 3 |
| 7 | 'STP' | 'STP 1' | 113033 | 'RTU 7 RECEIVING' | 3 |
| 8 | 'STP' | 'STP 1' | 113039 | 'RTU 8 MGR/$/RRs' | 2 |
| 9 | 'STP' | 'STP 1' | 13048 | 'RTU 9 COPYCNTR' | 1 |
| 10 | 'STP' | 'STP 100' | 116536 | 'RTU 1 S.RGTREAR' | 1 |
| 11 | 'STP' | 'STP 100' | 116541 | 'RTU 2 S.RGTFRNT' | 1 |
| 12 | 'STP' | 'STP 100' | 116543 | 'RTU 3 S.LFTREAR' | 1 |
| 13 | 'STP' | 'STP 100' | 116545 | 'RTU 4 S.LFTFRNT' | 1 |
| 14 | 'STP' | 'STP 100' | 116547 | 'RTU 5 MGR/RR' | 2 |
| 15 | 'STP' | 'STP 100' | 116549 | 'RTU 6 CENTER' | 1 |
| 16 | 'STP' | 'STP 1000' | 143667 | 'RTU 1 S.LFTCNTR' | 1 |
| 17 | 'STP' | 'STP 1000' | 143668 | 'RTU 2 S.LFTREAR' | 1 |

FIG. 4F

| customer_code | entity_subtype_name | entity_class_friendly_name | number_of_core_names | entity_class_id | entity_subtype_id |
|---|---|---|---|---|---|
| Customer 1 | Roof Top Unit | Common Space Unit | 912 | 2 | 1 |
| Customer 1 | Roof Top Unit | Dedicated Space Unit | 126 | 1 | 1 |
| Customer 1 | Roof Top Unit | Unknown Class | 1 | 0 | 1 |
| Customer 2 | Roof Top Unit | Dedicated Space Unit | 141 | 1 | 1 |
| Customer 2 | Roof Top Unit | Common Space Unit | 137 | 2 | 1 |
| Customer 2 | Roof Top Unit | Unknown Class | 1 | 0 | 1 |
| Customer 3 | Roof Top Unit | Common Space Unit | 838 | 2 | 1 |
| Customer 3 | Roof Top Unit | Dedicated Space Unit | 354 | 1 | 1 |
| Customer 3 | Roof Top Unit | Unknown Class | 7 | 0 | 1 |
| Customer 4 | Roof Top Unit | Common Space Unit | 54 | 2 | 1 |
| Customer 4 | Roof Top Unit | Dedicated Space Unit | 47 | 1 | 1 |

FIG. 5

CLASSIFYING DEVICES FROM ENTITY NAMES BASED ON CONTEXTUAL INFORMATION

This application is a continuation of co-pending U.S. Patent application Ser. No. 16/206,629, filed Nov. 30, 2018, now U.S. Pat. No. 10,936,818 issued on 2 Mar. 2021, which is incorporated herein by reference.

TECHNICAL FIELD

The disclosure relates generally to building management systems, and more particularly to classifying devices of a building management system.

BACKGROUND

Contextual information needed by automated Fault Detection & Diagnostics (FDD) analytics is often unavailable in a machine-readable format. The problem is that the contextual information is stored in the form of a text label and that the correct interpretation of the text labels needs experience and knowledge by an individual familiar with a naming convention used by a particular customer. Moreover, naming conventions differ among world regions (e.g., America vs Europe), market verticals (e.g., retail stores, hotels, office buildings) as well as among individual customers. For instance, some customers tend to use a better naming convention than others. What would be desirable is an approach of processing text labels of various devices in order to extract useful contextual information carried by the device name. The device may then be assigned to a particular device class This may enable increased automated FDD analytics for various types of assets in commercial buildings, including Heating, Ventilation & Air Conditioning (HVAC) devices.

SUMMARY

In an example of the disclosure, a controller for classifying devices of a building management system (BMS) may be configured to obtain an entity name for a device, extract a core name from the entity name, compare the core name to a set of candidate core names, wherein each candidate core name is associated with a class. The controller may be further configured to determine scores for each comparison, identify a highest score from the determined scores, identify a class of a candidate core name associated with the highest score, and classify the device in the class associated with the candidate core name.

Alternatively or additionally to the foregoing, comparing the core name to the set of candidate core names may include constructing the core name into a core name set of bigrams, constructing each candidate core name from the set of candidate core names into a candidate core name set of bigrams, and comparing the core name set of bigrams to each candidate core name set of bigrams.

Alternatively or additionally to any of the embodiments above, comparing the core name set of bigrams to each candidate core name set of bigrams may include identifying a number of matching bigrams between the core name set of bigrams and each candidate core name set of bigrams.

Alternatively or additionally to any of the embodiments above, determining scores for each comparison may include dividing each number of matching bigrams by a number of bigrams from the core name set of bigrams to get a set of first results, dividing each number of matching bigrams by a number of bigrams from a corresponding candidate core name set of bigrams to get a set of second results, and summing the set of first results with the set of second results to get the score for each comparison.

Alternatively or additionally to any of the embodiments above, the BMS system may comprise an HVAC system and classes for the devices comprise a dedicated space device and a common space device.

Alternatively or additionally to any of the embodiments above, the BMS system may comprise a lighting system and classes for the devices comprise an outdoor light, an indoor light, a dedicated space light, and a common space light.

Alternatively or additionally to any of the embodiments above, the BMS system may comprise a controller system and classes for the devices comprise an executive controller, a unitary controller, and a lighting controller.

Alternatively or additionally to any of the embodiments above, the BMS system may comprise a meter system and classes for the devices comprise a main meter and a sub-meter.

Alternatively or additionally to any of the embodiments above, the controller may be further configured to assign the device to an unknown class when the controller is unable to obtain the entity name for the device or extract the core name from the entity name.

In another example of the disclosure, a system for classifying devices of a building management system (BMS) may comprise a device and a controller. The controller may be configured to obtain an entity name for the device, extract a core name from the entity name, compare the core name to a set of candidate core names, wherein each candidate core name is associated with a class. The controller may be further configured to determine scores for each comparison, identify a highest score from the determined scores, identify a class of a candidate core name associated with the highest score, and classify the device in the class associated with the candidate core name.

Alternatively or additionally to any of the embodiments above, comparing the core name to a set of candidate core names may include constructing the core name into a core name set of bigrams, constructing each candidate core name from the set of candidate core names into a candidate core name set of bigrams, and comparing the core name set of bigrams to each candidate core name set of bigrams.

Alternatively or additionally to any of the embodiments above, comparing the core name set of bigrams to each candidate core name set of bigrams may include identifying a number of matching bigrams between the core name set of bigrams and each candidate core name set of bigrams.

Alternatively or additionally to any of the embodiments above, determining scores for each comparison may include dividing each number of matching bigrams by a number of bigrams from the core name set of bigrams to get a set of first results, dividing each number of matching bigrams by a number of bigrams from a corresponding candidate core name set of bigrams to get a set of second results, and summing the set of first results with the set of second results to get the score for each comparison.

Alternatively or additionally to any of the embodiments above, the BMS system may comprise an HVAC system and classes for the devices comprise a dedicated space device and a common space device.

Alternatively or additionally to any of the embodiments above, the BMS system may comprise a lighting system and classes for the devices comprise an outdoor light, an indoor light, a dedicated space light, and a common space light.

Alternatively or additionally to any of the embodiments above, the BMS system may comprise a controller system and classes for the devices comprise an executive controller, a unitary controller, and a lighting controller.

Alternatively or additionally to any of the embodiments above, the BMS system may comprise a meter system and classes for the devices comprise a main meter and a sub-meter.

Alternatively or additionally to any of the embodiments above, the controller may be further configured to classify the device in an unknown class when the controller is unable to obtain the entity name for the device or extract the core name from the entity name.

In another example of the disclosure, a method for classifying devices of a building management system (BMS), the method may comprise obtaining, by a controller, an entity name for a device, extracting, by the controller, a core name from the entity name, comparing, by the controller, the core name to a set of candidate core names, wherein each candidate core name is associated with a class. The method may further comprise determining, by the controller, scores for each comparison, identifying, by the controller, a highest score from the determined scores, identifying, by the controller, a class of a candidate core name associated with the highest score, and classifying, by the controller, the device in the class associated with the candidate core name.

Alternatively or additionally to any of the embodiments above, the step of comparing the core name to the set of candidate core names may include constructing the core name into a core name set of bigrams, constructing each candidate core name from the set of candidate core names into a candidate core name set of bigrams, and comparing the core name set of bigrams to each candidate core name set of bigrams.

The above summary of some illustrative embodiments is not intended to describe each disclosed embodiment or every implementation of the present disclosure. The Figures and Description which follow more particularly exemplify these and other illustrative embodiments.

BRIEF DESCRIPTION OF THE FIGURES

The disclosure may be more completely understood in consideration of the following description in connection with the accompanying drawings, in which:

FIG. 4B-4F are illustrative classification tables; and

FIG. 5 is an illustrative customer data table.

Figure 1:
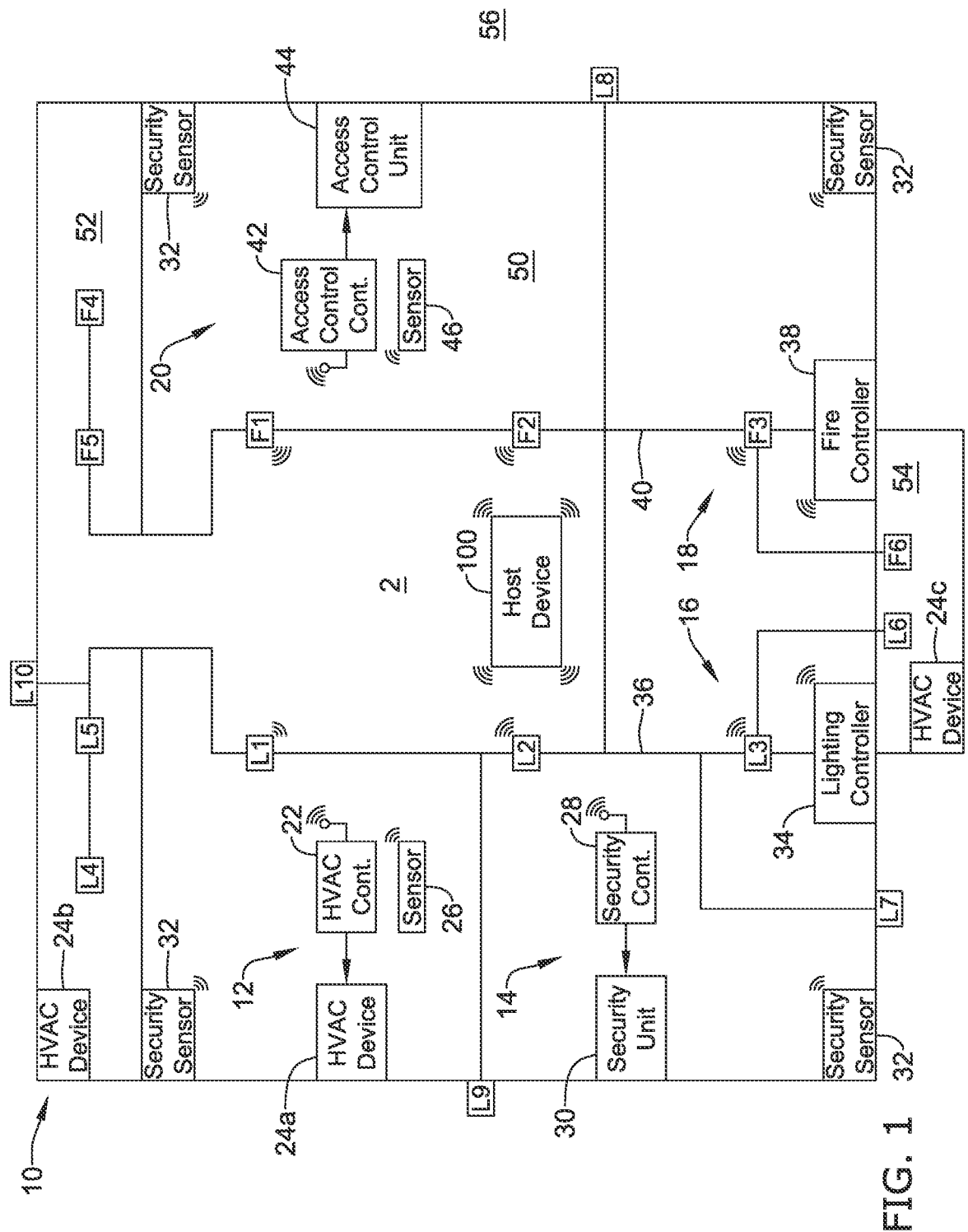
FIG. 1 is a schematic view of a building or structure that includes an illustrative building management system (BMS) for controlling client devices servicing the building or structure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", and so on, indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following description should be read with reference to the drawings in which similar structures in different drawings are numbered the same. The drawings, which are not necessarily to scale, depict illustrative embodiments and are not intended to limit the scope of the disclosure. Although examples of construction, dimensions, and materials may be illustrated for the various elements, those skilled in the art will recognize that many of the examples provided have suitable alternatives that may be utilized.

Certain embodiments of the present disclosure may be found in a system, a method, and/or a non-transitory computer-readable storage medium with an executable program stored thereon for classifying devices of a building management system (BMS). In various embodiments, controller(s) may be configured to obtain entity names for devices and extract core names from the entity names. The core names may be compared to candidate core names to determine scores. The highest score(s) may be identified and the devices may be classified based on the highest score. In this regard, a user and/or the BMS may have added insight to perform proper fault detection and diagnostics on the classified devices. This disclosure describes controllers, systems, methods, and executable programs that allow a BMS to more easily classify devices and monitor their overall operating status.

As used in this specification and the appended claims, the term entity may be an object of interest to be analyzed by a fault detection and diagnostics (FDD) system. Examples of entities may include, but are not limited to, building sites; floors; rooms; building zones; devices (e.g., roof top unit (RTU), lighting, pump, fan, and so forth); controllers; control loops; networks; and BMS's. As used herein, the term entity names may be strings used for labelling a specific entity. Examples of entity names may include, but are not limited to, "RTU 8 STOCKROOM", "RTU05 (Stockroom)", "RTU04 (RightRear)", "LTS01 (SalesZoneA)", "LTS06 (Canopy/ParkingLot)", "LTS05 (ExteriorSigns)", and "VAV01 (VAV BackOffices)". As used herein, the term core names may be strings representing the core contextual information carried by the entity name. It can be viewed as a cleaned-up version of the entity name. However, in some cases, the core name is not associated with a specific entity, but represents extracted contextual information. Examples of core names may include, but are not limited to, "STOCKROOM", "RGT/FRNTS", "RightRear", "Left", and "LeftRear". As used herein, the term classification results may be output of a classifier and may be represented by the entity class and entity class name. Entity Classes may be a numeric identifier representing the classification result of a particular entity. Examples of an entity class may include, but are not limited to, 0, 1, and 2. As used herein, the term entity class names may be strings representing the classification result of a particular entity. Examples of entity class names may include, but are not limited to, "Unknown Class", "Dedicated-Space Device", "Common-Space Device", "Outdoor Lighting", and "Unitary Controller". As used herein, the term classification tables may be input tables to the classifier (e.g., during the execution of the classifier). The classification table may also be called a "labelled list" (e.g., training data). As used herein, the term bigrams may be a sequence of two adjacent elements from a string of tokens, which are typically letters, syllables, or words. An example of a set of bigrams for the core name "sales" may include: ", a"; "a,l"; "l,e"; "e,s" (4 bigrams in this set).

FIG. 1 is a schematic view of a building or structure 10 that includes an illustrative building management system (BMS) 2 for controlling one or more client devices servicing the building or structure 10. The BMS 2, as described herein according to the various illustrative embodiments, may be used to control environmental conditions, lighting conditions, security settings, fire/smoke monitoring, and/or access settings in buildings such as, for example, retail stores, commercial offices, hospitals, clinics, restaurants, single family dwellings, hotels, multi-tenant buildings, and/or multi-use facilities. These are just some examples. It will be generally understood that the BMS 2 may be expanded and adapted to control and manage other systems and building control components, and may be deployed on a larger scale as the need arises. In addition, the BMS 2, as described herein, may provide a wireless retrofit solution for facilities employing older building control components that may be wired and that are currently incapable of receiving a wireless or digital command signal. For example, the BMS 2 may be configured to coordinate operational control of multiple building control components servicing the building or structure 10 that otherwise operate independently of one another. This may increase operational efficiency, reduce operational costs and/or maximize energy efficiency of the building or structure 10 in which the BMS 2 is deployed.

The illustrative BMS 2 shown in FIG. 1 includes one or more heating, ventilation, and air conditioning (HVAC) systems 12, one or more security systems 14, one or more lighting systems 16, one or more fire systems 18, and one or more access control systems 20. These are just a few examples of systems that may be included in the BMS 2. In some cases, the BMS 2 may include more or fewer systems. In some cases, each system may include a client device configured to provide one or more control signals for controlling one or more building control components and/or devices of the BMS 2. For instance, in some cases, the HVAC systems 12 may include an HVAC control device 22 used to communicate with and control one or more HVAC devices 24a-24c for servicing the building or structure 10. In some cases, the security system 14 may include a security control device 28 used to communicate with and control one or more security units 30 for monitoring the building or structure 10. In some cases, the lighting system 16 may include a lighting control device 34 used to communicate with and control one or more light banks 36 having lighting units L1-L10 for servicing the building or structure 10. In some cases, the fire system 18 may include a fire control device 38 used to communicate with and control one or more fire banks 40 having fire units F1-F6 for monitoring and servicing the building or structure 10. In some cases, the access control system may include an access control device 42 used to communicate with and control one or more access control units 44 for allowing access in, out, and/or around the building or structure 10.

In a simplified example, the BMS 2 may be used to control a single HVAC system 12, a single security system 14, a single lighting system 16, a single fire system 18, and/or a single access control system 20. In other embodiments, the BMS 2 may be used to communicate with and control multiple discrete building control devices 22, 28, 34, 38, and 42 of multiple systems 12, 14, 16, 18 and 20. The devices, units, and controllers of the systems 12, 14, 16, 18, and 20 may be located in different zones and rooms, such as a common space area 50 and (e.g., multi-person office, living room, kitchen, multi-person bathroom, lounge, and so forth), a dedicated space area (e.g., single-person office, single-person bathroom, bedroom, conference room, and so forth), or outside 56 of the building 10. In some cases, the systems 12, 14, 16, 18, and 20 may be powered by line voltage, and may be powered by the same or different electrical circuit. While FIG. 1 shows control device 22 controlling HVAC devices 24a-24c, control devices 28 and 42 controlling two units 30 and 44, a lighting control device 34 for controlling lighting bank 36 having ten lighting units L1-L10, and a fire control device 38 for controlling fire bank 40 having six fire units F1-F6, it is contemplated that the BMS 2 may be used to control other suitable building control components that may be used to service the building or structure 10.

According to various embodiments, the BMS 2 may include a host device 100 that may be configured to communicate with the discrete systems 12, 14, 16, 18, and 20 of the BMS 2. In some cases, the host device 100 may be configured with an application program that assigns devices of the discrete systems to a particular device (entity) class (e.g., common space device, dedicated space device, outdoor lighting, unitary controller, and so on). In some cases, there may be multiple hosts. For instance, in some examples, the host device 100 may be one or many of the control devices 22, 28, 34, 38, and 42.

In some cases, the building control devices 22, 28, 34, 38, and 42 may be configured to transmit a command signal to its corresponding building control component(s) for activating or deactivating the building control component(s) in a desired manner. In some cases, the building control devices 22, 28, 34, 38, and 42 may be configured to receive a classification of building control component and may transmit a corresponding command signals to their respective building control component in consideration of the classification of the building control component.

In some instances, the building control devices 22, 28, and 42 may be configured to receive signals from one or more sensors 26, 32, and 46 located throughout the building or structure 10. In some cases, the building control devices 34 and 38 may be configured to receive signals from one or more sensors operatively and/or communicatively coupled with the lighting units L1-L10 and/or the fire units F1-F6 located throughout the building or structure 10. In some cases, the one or more sensors may be integrated with and form a part of one or more of their respective building control devices 22, 28, 34, 38, and 42. In other cases, one or more sensors may be provided as separate components from the corresponding building control device. In still other instances, some sensors may be separate components of their corresponding building control devices while others may be integrated with their corresponding building control device. These are just some examples. The building control devices 22, 28, 34, 38, 42 and the host device 100 may be configured to use signal(s) received from the one or more sensors to operate or coordinate operation of the various BMS systems 12, 14, 16, 18, and 20 located throughout the building or structure 10.

The one or more sensors 26, 32, 46, L1-L10, and F1-F6 may be any one of a temperature sensor, a humidity sensor, an occupancy sensor, a light sensor, a current sensor, smoke sensor and/or any other suitable sensor. In one example, at least one of the sensors 26, 32, 46, or other sensors, may be an occupancy sensor. The building control devices 22, 28, 34, 42 and/or the host device 100 may receive a signal from the occupancy sensor indicative of occupancy within a room or zone of the building or structure 10. In response, the building control devices 22, 28, 34, and/or 42 may send a command to activate one or more building control component(s) located in or servicing the room or zone where occupancy is sensed.

Likewise, in some cases, at least one of the sensors 26 may be a temperature sensor configured to send a signal indicative of the current temperature in a room or zone of the building or structure 10. The building control device 22 may receive the signal indicative of the current temperature from the temperature sensor 26. In response, the building control device 22 may send a command to HVAC device 24 to activate and/or deactivate the HVAC device 24 that is in or is servicing that room or zone to regulate the temperature in accordance with a desired temperature set point.

In yet another example, one or more of the sensors may be a current sensor. The current sensor may be coupled to the one or more building control components and/or an electrical circuit providing electrical power to one or more building control components. The current sensors may be configured to send a signal to a corresponding building control device, which indicate an increase or decrease in electrical current associated with the operation of the building control component. This signal may be used to provide confirmation that a command transmitted by a building control device has been successfully received and acted upon by the building control component(s). These are just a few examples of the configuration of the BMS and the communication that can take place between the sensors and the control devices.

Figure 2:
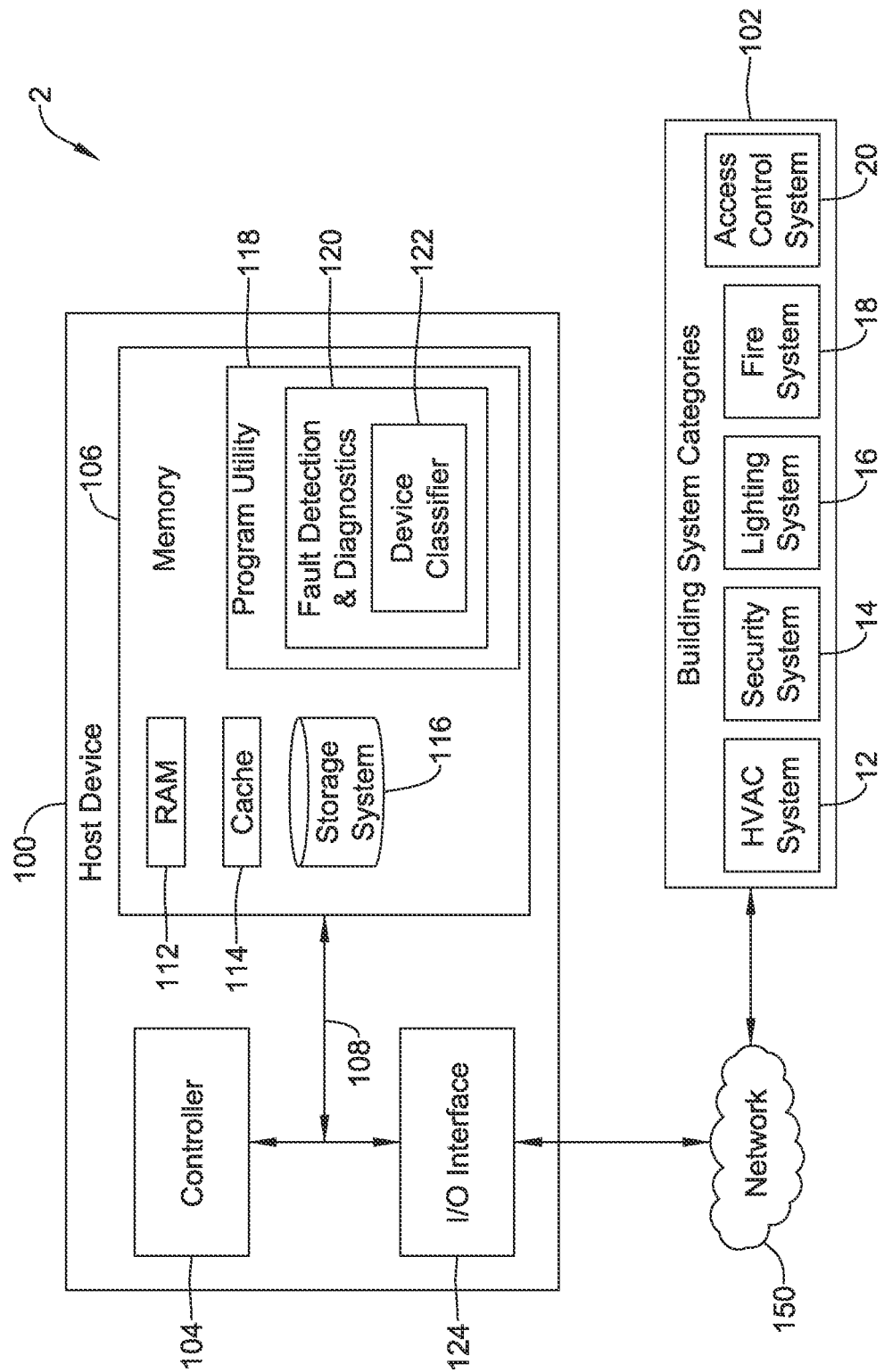
FIG. 2 is a schematic block diagram of the illustrative BMS.

FIG. 2 is a schematic block diagram of the illustrative BMS 2. In certain embodiments, the BMS 2 may include the host device 100 and building system categories 102 that may include, but are not limited to, the HVAC system 12, the security system 14, the lighting system 16, the fire system 18, and the access control system 20.

In some embodiments, the HVAC system 12 may include one or more HVAC devices (e.g., Air Handing Units (AHU), Variable-Air-Volume (VAV) units, roof top units (RTU), fan coil units (FCU), dampers, valves, fans, heating units, cooling units, sensors, thermostats, humidifiers, dehumidifiers, and so forth), which allow for the monitoring and/or control of temperature and/or other environmental conditions in the building. The security system 14 may include, sensors, alarm devices, audio/visual devices, lights, contact sensors for monitoring the state of doors and windows, security card pass systems, electronic locks, and so on. The fire system 18 may include smoke/heat sensors, a sprinkler system, warning lights, and so forth. The access control system 20 may include doors, door locks, windows, window locks, turnstiles, parking gates, elevators, or other physical barrier, where granting access can be electronically controlled. The lighting system 16 may include emergency lights, outlets, lighting, exterior lights, drapes, and general load switching, some of which are subject to "dimming" control which varies the amount of power delivered to the various building control devices. These are just a few examples of building system categories 102. In some cases, the building system categories 102 may also include low voltage devices (not shown) that may include, but are not limited to, garage door openers, lawn sprinklers, and pool/spa heaters (controlled via a relay or the like).

As shown in Figure the host device 100 can function as a server, a client, a local controller, or any other suitable device. In the example shown, the host device 100 can perform various communication and data transfer functions as described herein and can execute one or more application functions. The host device 100 can be any of a wide variety of computing devices, such as a server computer, a desktop computer, a handheld computer, a tablet computer, mobile telephone or other mobile device, and the like. The components of the host device 100 may include, but are not limited to, a controller 104, a system memory 106, and a bus 108 that couples various system components including system memory 106 to the controller 104.

The controller 104 may include one or more controllers or processors that execute instructions stored in the system memory 106. In some instances, the controller 104 may include a pre-programmed chip, such as a very-large-scale integration (VLSI) chip and/or an application specific integrated circuit (ASIC). In such embodiments, the chip may be pre-programmed with control logic in order to control the operation of the host device 100. In some cases, the pre-programmed chip may implement a state machine that performs the desired functions. By using a pre-programmed chip, the controller 104 may use less power than other programmable circuits (e.g., general purpose programmable microprocessors) while still being able to maintain basic functionality. In other instances, the controller 104 may include a programmable microprocessor. Such a programmable microprocessor may allow a user to modify the control logic of the host device 100 even after it is installed in the field (e.g., firmware update), which may allow for greater flexibility of the host device 100 in the field over using a pre-programmed ASIC.

When provided, the bus 108 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The host device 100 may include a variety of computer system readable media. Such media may be any available media that is accessible by the host device 100, and it may include volatile memory, non-volatile memory, removable and non-removable media.

The system memory 106 of the host device 100 can include computer system readable media in the form of volatile memory, such as random access memory (RAM)

112 and/or cache memory 114. Computing device 102 may further include other removable/non-removable, volatile/non-volatile computer system storage media. By way of example only, storage system 116 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 108 by one or more data media interfaces. As will be further depicted and described below, the system memory 106 may include at least one program product having a set of program modules that are configured to carry out the functions of assigning devices from the building system categories 102 to particular device classes.

In one example, program/utility 118 may be stored in the system memory 106 and may include a set of application program modules (e.g., software), such as fault detection and diagnostics (FDD) 120. In some cases, the program/utility 118 may include additional program modules as well as an operating system, one or more other application program modules, and program data. According to various embodiments, the application program modules (e.g., the FDD 120) may include a device classifier 122, for example. In certain embodiments, the FDD 120, including the device classifier 122, may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The FDD 120 may execute on the host device 100. In some cases, the FDD 120 may execute on one or many of the building system categories 102. In some cases, part of the FDD 120 is executed on the host device 100 and part of the FDD 120 is executed on the building system categories 102. In any scenario, the building system categories 102 may be connected to the host device 100 through any type of network (e.g., network 150), including a local area network (LAN) or a wide area network (WAN), or the connection may be made to an external computer (for example, through the Internet using an Internet Service Provider). In various embodiments, the host device 100 may communicate with one or more devices from the various systems of the building system categories 102 over the network 150. Such communication can occur via Input/Output (I/O) interface(s) 124. In some cases, the controller 104 of the local computing device 102 may be operatively coupled to I/O interface(s) 124 via the bus 108, and may use the I/O interface 124 to communicate with devices from the building system categories 102.

Figure 3:
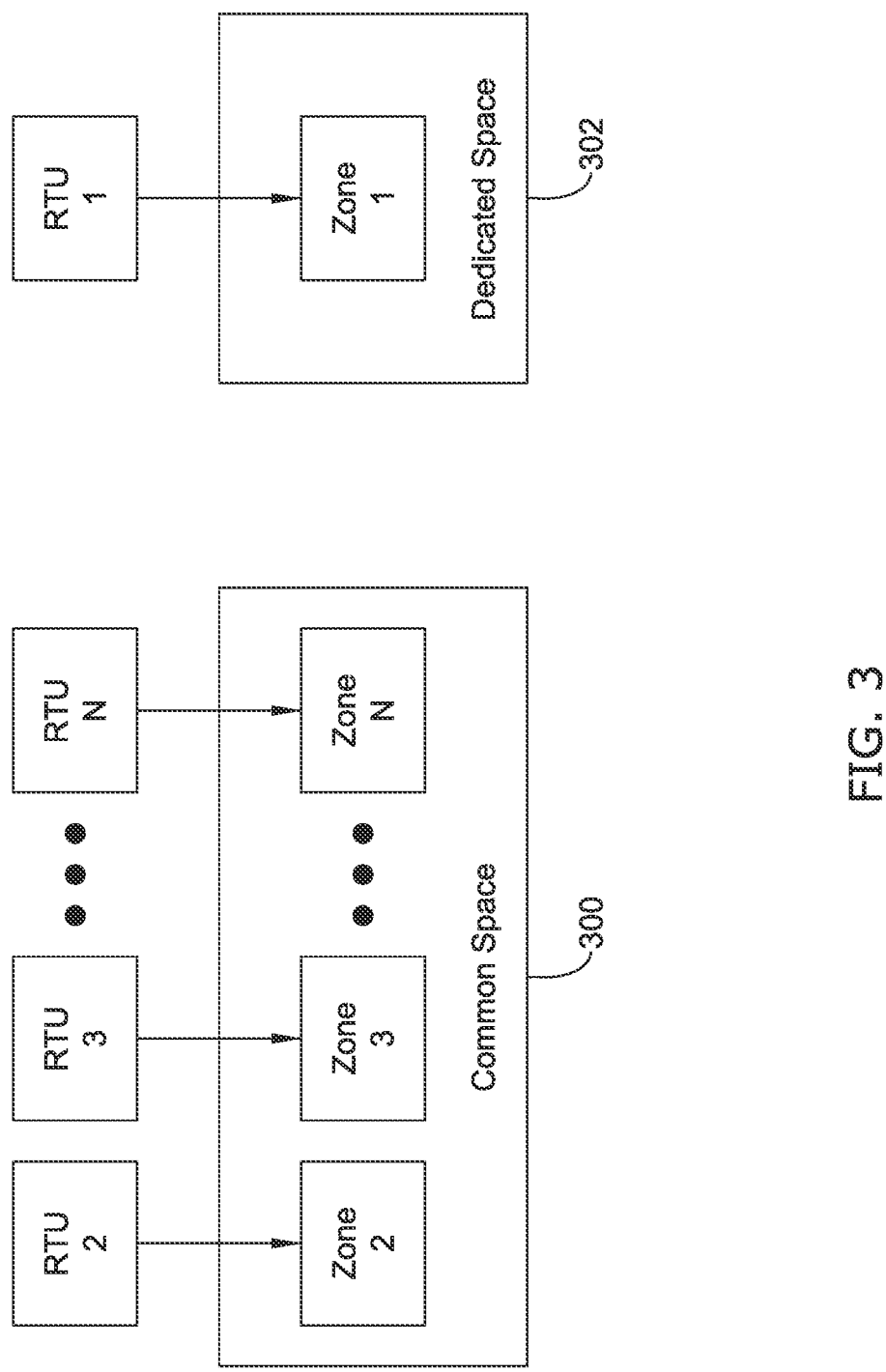
FIG. 3 is a schematic view of RTU's servicing a common space and a dedicated space.

In some cases, the device classifier 122 may provide instructions to the controller 104 to extract contextual information from a device name and assign the device to a specific device (entity) class. For example, turning to FIG. 3, RTU's of the HVAC system 12 may be classified as a common space device or a dedicated space device. In some instances, a common space 300 may have or be, for example, a sales area, main shopping area in retail stores, or any large room with several devices working together as a group. In this case, RTU's 2-N may heat and cool the common space 300. For instance, RTU 2 may control the temperature of zone 2 based on a temperature set point for zone 2, RTU 3 may control the temperature of zone 3 based on a temperature set point for zone 3, and so on. In some cases, failure of one or more the RTU's 2-N may not necessarily lead to zone discomfort since neighboring RTU's can compensate for a failure of a particular RTU. In some instances, a dedicated space 302 may be, for example, a manager's office, a private bathroom, a bedroom, or any smaller room with a single device dedicated to the room. In this case, RTU 1 may heat and cool the dedicated space 302. For instance, RTU 1 may control the temperature of zone 1 based on a temperature set point for zone 1. In some cases, failure of RTU 1 will very likely lead to discomfort in the dedicated space 302 because there is no other RTU to provide cooling or heating. As such, in some cases, the device classifier 122 may allow the FDD 120 to give devices classified as dedicated space devices a higher ranking score when affected by a particular fault than common space devices. Moreover, the device classifier 122 may enable the FDD 120 to establish a certain set of rules for common space devices and another set of rules for dedicated space devices. Such separation of rules may allow the FDD 120 to better identify faults of the devices of the building system categories 102.

Accordingly, in some cases, the device classifier 122 may provide instructions to the controller 104 to obtain an entity name for RTU 1 and RTU 2. In some instances, RTU 1 may have the entity name "RTU01 (MngrOff)" and RTU 2 may have the entity name "RTU02 (SlsZone2)". The device classifier 122 may then provide instructions to the controller 104 to extract core names from the entity names. In this case, the core name extracted from "RTU01 (MngrOff)" may be "MngrOff" and the core name extracted from "RTU02 (SlsZone2)" may be "SlsZone2". The device classifier 122 may then provide instructions to the controller 104 to compare the core names to a set of candidate core names. For instance, the controller 104 may compare "MngrOff" to "ManagerOff", "ManagerBath", and "ConferenceRm" and compare "SlsZone2" to "SalesZone2", "SalesZone3", and "SalesZone4". To compare the core names to the candidate core names, in some cases, the device classifier 122 may provide instructions to the controller 104 to construct the core name and the candidate core names into a set of bigrams and compare the set of bigrams for the core names to each set of bigrams for the candidate core names. For instance, the set of bigrams for "MngrOff" may be "Mn", "ng", "gr", "rO", "Of", and "ff". The set of bigrams for "ManagerOff" may be "Ma", "an", "na", "ag", "ge", "er", "rO", "Of", and "ff"; the set of bigrams for "ManagerBath" may be "Ma", "an", "na", "ag", "ge", "er", "rB", "Ba", "at", and "th"; and the set of bigrams for "ConferenceRm" may be "Co", "on", "nf", "fe", "er", "re", "en", "nc", "ce", "eR", and "Rm". The controller 104 may then compare the set of bigrams for "MngrOff" to the set of bigrams for "ManagerOff", "ManagerBath", and "ConferenceRm" and match the number of bigrams to determine a score for each comparison. Similarly, the set of bigrams for "SlsZone2" may be "Sl", "ls", "sZ", "Zo", "on", "ne", "e2". The set of bigrams for "SalesZone2" may be "Sa", "al", "le", "es", "sZ", "Zo", "on", "ne", "e2"; the set of bigrams for"SalesZone3" may be "Sa", "al", "le", "es", "sZ", "Zo", "on", "ne", "e3"; and the set of bigrams for"SalesZone4" may be "Sa", "al", "le", "es", "sZ", "Zo", "on", "ne", "e4". The controller 104 may then compare the set of bigrams for "SlsZone2" to the set of bigrams for "SalesZone2", "SalesZone3", and "SalesZone4" and match the number of bigrams to determine a score for each comparison. The device classifier 122 may then provide instructions to the controller 104 to identify a highest score from the determined scores and identify the candidate core name associated with the highest score. In this case, the controller may identify that the comparison between the set of bigrams for "MngrOff" and the set of bigrams for "ManagerOff" produce the most number of matches and therefore, the highest score. Furthermore, "ManagerOff" may be classified as a dedicated space RTU. As such, the controller 104 may classify RTU 1 as a dedicated space RTU. Moreover, the controller may identify that the comparison between the set of bigrams for "SlsZone2" and the set of bigrams for "SalesZone2" produce the most number of matches and therefore, the highest score. Furthermore, "SalesZone2" may be classified as a common space RTU. As such, the controller 104 may classify RTU 2 as a common space RTU.

This is just one example of how the device classifier 122 may provide instructions for the controller 104 to classify devices of a BMS. In some cases, the device classifier 122 may have altered instructions which the controller 104 may use to determine scores for classifying the RTU's. Moreover, an RTU is just one example of a device that may be classified, and common space and dedicated space are just two types of classes for which a RTU may be classified. In some examples, the controller 104 may classify lights as outdoor lights, indoor lights, dedicated space lights, common space lights, and so on. In some examples, the controller 104 may classify controllers as executive controllers, unitary controllers, lighting controllers, and so on. In some examples, the controller 104 may classify meters as main meters, submeters, and so forth. Additionally, in some cases, the controller 104 may not be able to obtain an entity name for a device or may not be able to extract a core name from the entity name. For instance, a devices label may not be sufficiently clear (i.e., descriptive). As such, the controller 104 may assign the device to an unknown class.

Figure 4A:
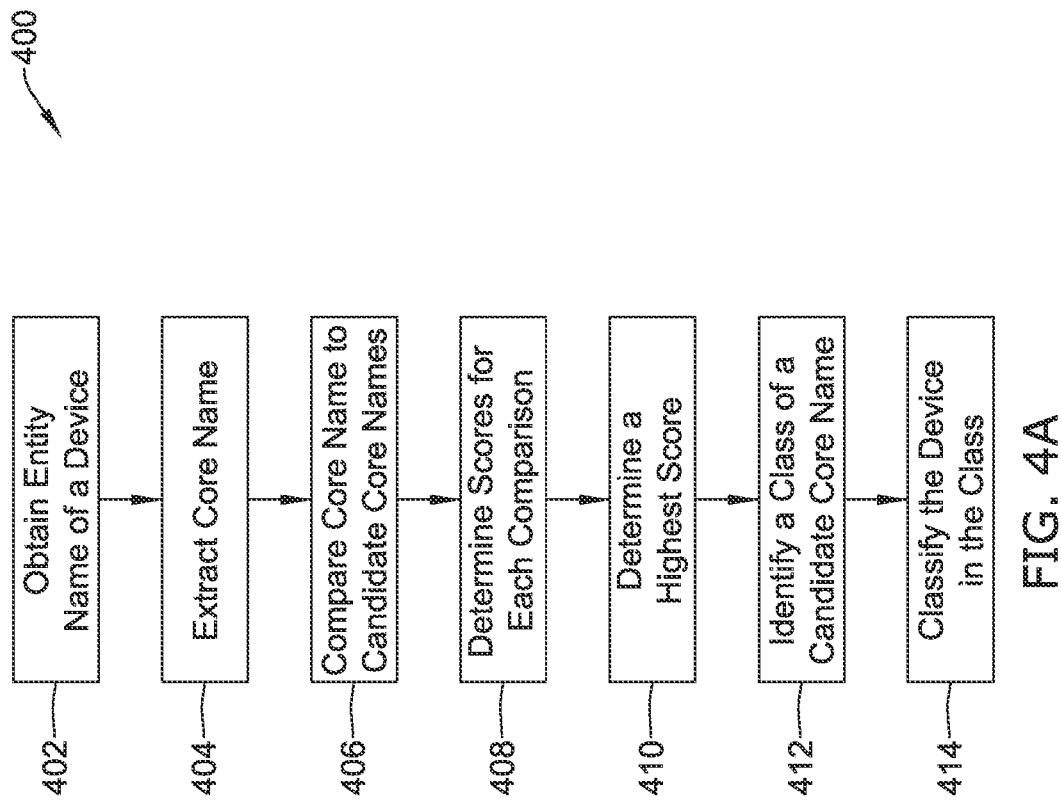
FIG. 4A is an illustrative method.

FIG. 4A is a flow diagram of an illustrative method 400 for classifying devices of a BMS. FIG. 4A will be described in conjunction with FIGS. 4B-4F. In some cases, embodiments of the present disclosure may be accessible to customers using the BMS 2, from FIG. 2. Customers may include, but are not limited to, buildings, owners of buildings, renters of building space, and owners of systems (e.g., building system categories 102) located in a building. For simplicity, one may describe the method 400 with regard to one customer (i.e., customer 1). Moreover, in this example, the devices classified will be limited to RTU's. In some cases, the method 400 may begin at step 402 with the controller 104 of the host device 102 of FIG. 2, obtaining an entity name for a device. The entity name may be obtained or received in many different ways. In some examples, the controller 104 may obtain the entity name directly from the device or a controller of the device. In some cases, the controller 104 may receive the entity name from an owner (e.g., customer 1), user, or technician servicing the device. In some cases, the controller 104 may obtain the entity name by querying database tables. Turning to FIG. 4B, classification table 500 may be configured to record the entity names for several devices owned by customer 1. As shown, classification table 500 includes entity names for the RTU's servicing site 1 and site 2. In some instances, site 1 and site 2 may be two different floors of a building. In other instances, site 1 and site 2 may be two wholly separate buildings. In still further instances, site 1 and site 2 may be two wholly separate sites or areas and multiple buildings may be located at each site. In any case, in this example, the controller 104 may be classifying the device with the entity name 'RTU 3 S.LFTREAR' (highlighted and enlarged for clarity). As such, the controller 104 may obtain the entity name 'RTU 3 S.LFTREAR' from classification table 500.

Turning back to FIG. 4A, at step 404, the controller 104 may extract a core name from the entity name. In some cases, the controller may identify the core name as a cleaned-up version of the entity name or identifies contextual information from a portion of the entity name and determines that the portion is the core name. For instance, the controller 104 may be able to identify portions of the entity name that are universal for all the RTU devices. For example, in this case, the controller may recognize "RTU" from 'RTU 3 S.LFTFEAR' as a universal label and remove it from the entity name. The controller 104 may then be able to parse out and identify "LFTREAR" from the remaining entity name as contextual information and determine that to be the core name of the device. At step 406, the controller 104 may compare the "LFTREAR" to a set of candidate core names. Turning to FIG. 4C, table 600 includes a list of candidate core names. As shown, classification table 600 includes the candidate core names: "LeftRear", "LeftFront", "Manager", "MgrOffice", "Storeroom", and "Receiving". In some examples, the controller 104 may access the classification table 600 and obtain the list of candidate core names. The controller 104 may then compare "LFTREAR" to each candidate core name. Turning back to FIG. 4A, at step 408, the controller 104 may determine a score (e.g., a classification score) for each comparison. In some cases, the classification score may be calculated by constructing the extracted core name into a set of bigrams for the extracted core name and constructing a set of bigrams for each candidate core name. The controller 104 may then look at the number of matching bigrams in the sets made from the core names. For instance, the controller 104 may count the number of bigrams from the extracted core name that appear in each candidate core name. The controller 104 may then divide the number of matching bigrams by the number of bigrams from the extracted core name. Similarly, the controller may divide the number of matching bigrams by the number of bigrams from each candidate core name. The controller 104 may then obtain the classification score by summing these two values.

For example, turning to FIG. 4D, classification table 700 depicts the comparing of the bigram for "LFTREAR" with the bigram for "LeftRear". As shown, the bigram set for "LFTREAR" includes "L, F", "F, T", "T, R", "R, E", "E, A", and "A,R". Similarly, the bigram set for "LeftRear" includes "L, e", "e, f", "f, t", "t, R", "R, e", "e, a", and "a, r". Accordingly, the number of matches of the bigram sets is 5 (i.e., "f, t", "t, r", r, e", "e, a", and "a, r"). Moreover, the number of bigrams from the bigram set for "LFTREAR" is 6. As such, the controller 104 may divide 5 by 6 to obtain a preliminary score of 0.83333. Additionally, the number of bigrams from the bigram set "LeftRear" is 7. As such, the controller 104 may divide 5 by 7 to obtain a preliminary score of 0.71428. The controller 104 may then sum the two preliminary scores to obtain the classification score of 1.5476. Similarly, classification table 702 depicts the comparing of the bigram for "LFTREAR" with the bigram for "RightRear". As shown, the bigram set for "RightRear" includes "R, i", "i, g", "g, h", "h, t", "t, R", "R, e", "e, a" and "a, r". Accordingly, the number of matches of the bigram sets is 4 (i.e., "t, r", "r, e", "e, a" and "a, r"). Moreover, the number of bigrams from the bigram set for "LFTREAR" is 6. As such, the controller 104 may divide 4 by 6 to obtain a preliminary score of 0.66666. Additionally, the number of bigrams from the bigram set "RightRear" is 8. As such, the controller 104 may divide 4 by 8 to obtain a preliminary score of 0.5. The controller 104 may then sum the two preliminary scores to obtain the classification score of 1.16666.

Turning back to FIG. 4A, at step 410, the controller 104 may identify a highest classification score from the comparisons between the extracted core name and the candidate core names. At step 412, the controller 104 may then identify the entity class of the candidate core name associated with the highest score. For example, turning to FIG. 4E, classification table 800 shows the classification scores for each comparison with the candidate core names. In this example, the winning classification score is the entity class with the highest classification score. Additionally, precision score table 802 may shows a precision score that may be calculated to measure how much better the winning classification score is compared to the second best classification score. In some instances, the second best classification score may be defined as the highest classification score of the candidate core name having a different entity class than the winning entity class. For example, as shown in table 802, the winning classification score is 1.5476 belonging to entity class 1 (i.e., the entity class of "LeftRear"). The second best classification score is 0.5 belonging to entity class 3 (i.e., the entity class of "Storeroom"). The precision score may be the ratio of the winning classification score and the second best classification score (i.e., 1.6666/0.5=3.33332).

Turning back to FIG. 4A, at step 414, the controller 104 may classify the device in the entity class with the winning classification score. For example, turning to FIG. 4F, in this example the entity class 1 had the winning classification score. As such, the controller 104 classifies the device (i.e., 'RTU 3 S.LFT REAR') in entity class 1, as shown in classification results table 900. Additionally, as stated herein, in some cases the controller 104 may not be able to obtain an entity name for a device or may not be able to extract a core name from the entity name. For instance, a device's label may not be sufficiently clear (i.e., descriptive) or a query table may not be available for the controller 104 to obtain the entity name. As such, in these cases, the controller 104 may assign the device to an unknown class.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

Embodiments of the current disclosure may have several applications. For instance, the output can be used for predictive modelling of devices and systems of a BMS. In some cases, dedicated-space devices may be given a higher ranking score when being affected by a particular fault in comparison to the same fault affecting a common-space device. For example, device failure may be defined as a conditioned space not reaching a setpoint in a reasonable period of time. As such, when dedicated space devices fail, zone discomfort may likely occur. For instance, when a dedicated space RTU experiences failure, individuals in the dedicated space may experience a degradation in cooling/heating performance. However, when a common space RTU experiences failure, individuals in the common space may not experience a degradation in cooling/heating performance due to other RTU's of the common space compensating for the failed RTU. Accordingly, the device classifier disclosed herein may provide the needed information for a rule-based FDD (e.g., FDD 120) to establish different rules for similar devices with different classifications.

Another output of this system (e.g., number of core names) may provide an insight about the quality of the naming convention used by individual customers. This metric may be used to identify issues in the naming convention and to rectify them. For instance, turning to FIG. 5, table 1000 may show customer data. Table 1000 may be sorted by the customer name and the number of core names used by each customer. Table 1000 may also provide the insight that a customer (i.e., Customer 4) has a good naming convention, while other customers (i.e., Customer 1 and Customer 3) have an opportunity to improve their naming conventions. This insight may be gained using the "number of core names" metric. In some case, this metric may be further improved by normalizing to the number of sites, (e.g., to compute the number of core names divided by the number of sites).

In further examples, context info/meta data for identifying history data points associated with a list of devices for analytics application could be discovered based on the existing classification of the devices. In some cases, a BMS may provide the classification of the devices that can be used as a template to help define a control logic application that is downloaded and run in multiple controller devices to control similar devices (e.g., VAVs, AHUs, and so on). For instance, a Context Info Discovery (CID) logical component that is part of an analytics application could be added as an integral subsystem or a separate process of a BMS. The CID component may define an interface for of its dependent Equipment Context Info Discovery components to be registered and provide a Context Point List associated with the specific device. Each Equipment Context Info Discovery component in turn may be implemented by a dependent subcomponent(s) that could discover or mine context information from control logic application points. In one example, a simple/automatic discovery may be based on the typical BMS's pre-defined template control logic applications. In this scenario, these templates may already include a pre-defined mapping of device points to equipment to be used when a template is bound to device controlling equipment. In another example, the template/instance of control logic application data format may be known. Therefore, the solution mainly needs input from users for the mapping definition of a template point list. In a more complex scenario where data format is unknown, an adaptor for converting/mining the template point list may need to be implemented first. In a further example, the control logic's sequence of operations or patterns may be analyzed that could be inferred as logic fragment controlling specific devices and the specific semantic points involved. The solution for this method may need dependent adapter(s) for each specific control logic type to understand the format/syntax/semantics, idiomatic style, and domain specific knowledge of each device in order to derive the contextual point info.

The above description is intended to be illustrative, and not restrictive. For example, the above-described examples (or one or more aspects thereof) may be used in combination with each other. Also, in the above Description, various features may be grouped together to streamline the disclosure. This should not be interpreted as intending that an unclaimed disclosed feature is needed for any claim. Rather, subject matter may lie in less than all features of a particular disclosed embodiment. Thus, the following claims are hereby incorporated into the Description as examples or embodiments, with each claim standing on its own as a separate embodiment, and it is contemplated that such embodiments can be combined with each other in various combinations or permutations. The scope of the present system should be determined with reference to the appended claims, along with the full scope of equivalents to which such claims are entitled.

What is claimed is:

1. A system for classifying devices of a building management system (BMS), the system comprising:
   a device; and
   a controller configured to:
      obtain an entity name for the device;
      determine contextual information from the entity name;
      determine a core name based on the contextual information; and
      classify the device in a class based on the core name, wherein classification of the device in the class based on the core name comprises:
         comparison of the core name to a set of candidate core names, wherein each candidate core name is associated with one of a plurality of classes;
         identification of a highest score for at least one class based on comparison of the core name to the set of candidate core names; and
         classification of the device in the at least one class associated with the highest score.

2. The system of claim 1, wherein the controller is further configured to associate a score with the device based on the class in which the device is classified.

3. The System of claim 1, further comprising a fault detection and diagnostics (FDD) application program module at least partially executed by one or both of the device and the controller.

4. The system of claim 3, wherein the FDD application program module is configured to associate a score with the device based on the class in which the device is classified and a fault identifiable by the FDD application program module.

5. The system of claim 3, wherein the FDD application program module is configured to identify a fault of the device and the FDD application program module associates a set of rules for identifying the fault based on the class in which the device is classified.

6. The system of claim 1, wherein the device is in communication with one or more sensors configured to sense building parameters.

7. The system of claim 1, further comprising:
   a building control device in communication with the device; and
   wherein the building control device is configured to transmit command signals to the device based on the class in which the device is classified.

8. The system of claim 7, wherein:
   the building control device is in communication with one or more sensors configured to sense building parameters; and
   the building control device is configured to transmit command signals to the device based on the class in which the device is classified and signals from the one or more sensors.

9. The system of claim 1, wherein the controller is configured to determine the core name by:
   identifying one or more universal terms in the entity name;
   disregard the one or more universal terms and identify a remaining portion of the entity name;
   determine the contextual information from the remaining portion of the entity name; and
   determine the core name from the contextual information.

10. A controller for classifying devices of a building management system (BMS), the controller configured to:
    obtain an entity name for a device of the BMS;
    determine contextual information from the entity name;
    determine a core name based on the contextual information; and
    classify the device in a class based on the core name, wherein the classification of the device in the class based on the core name comprises:
       comparison of the core name to a set of candidate core names, wherein each candidate core name is associated with one of a plurality of classes;
       identification of a highest score for at least one class based on comparison of the core name to the set of candidate core names; and
       classification of the device in the at least one class associated with the highest score.

11. The controller of claim 10, wherein the controller is further configured to:
    identify one or more universal terms in the entity name;
    disregard the one or more universal terms and identify a remaining portion of the entity name;
    determine the contextual information from the remaining portion of the entity name; and
    determine the core name from the contextual information.

12. The controller of claim 10, wherein:
    the controller is further configured to execute at least part of a fault detection and diagnostics (FDD) application program module; and
    the FDD application program module is configured to associate a score with the device based on the class in which the device is classified and a fault identifiable by the FDD application program module.

13. The controller of claim 12, wherein the FDD application program module is configured associate a set of rules for identifying the fault based on the class in which the device is classified.

14. The controller of claim 10, wherein classifying the device in a class based on the core name further comprises:
    determination of at least one score for each comparison of the core name to the set of candidate core names.

15. The controller of claim 10, wherein the device is communicatively coupled to one or more sensors configured to sense building parameters, and wherein the device is communicatively coupled to a building control device.

16. The controller of claim 15, wherein the building control device is configured to transmit command signals to the device based on the class in which the device is classified.

17. The controller of claim 15, wherein the building control device is communicatively coupled to one or more sensors configured to sense building parameters, and wherein the building control device is configured to transmit command signals to the device based on the class in which the device is classified and signals from the one or more sensors.

* * * * *